United States Patent [19]
Dufayet

[11] 3,737,764
[45] June 5, 1973

[54] EDDY-CURRENT TEST APPARATUS FOR DETECTION OF FLAWS IN A METAL SEAL PLACED WITHIN AN ELECTRICALLY CONDUCTIVE TUBE

[75] Inventor: Jean-Pierre Dufayet, Aix-En Provence, France

[73] Assignee: Commissariat A L'Energie Atomique, Paris, France

[22] Filed: Sept. 27, 1971

[21] Appl. No.: 183,852

[52] U.S. Cl. ................................................. 324/40
[51] Int. Cl. ............................................. G01r 33/12
[58] Field of Search ................................... 324/37, 40

[56] References Cited
UNITED STATES PATENTS
3,135,914  6/1964  Callan et al. ........................... 324/40
3,302,105  1/1967  Libby et al. ............................ 324/40

FOREIGN PATENTS OR APPLICATIONS
1,470,386  1/1967  France ................................. 324/40
1,072,436  6/1967  Great Britain ........................ 324/37

Primary Examiner—Robert J. Corcoran
Attorney—William B. Kerkam, Jr.

[57] ABSTRACT

A method and apparatus for eddy-current detection of flaws such as bubbles and different characteristics of a metal seal within an electrically conductive tube. The method consists in recording separately on the one hand the variations in potential which are directly related to variations in amplitude of the eddy currents as a function of the cross-section of the tube and on the other hand the variations in the frequency of said currents also as a function of said cross-section while also recording simultaneously with these two variations the variations in said potential as a function of said frequency, the frequency of the eddy currents being determined as a function of the nature and shape of the tube and of the seal.

1 Claim, 6 Drawing Figures

Patented June 5, 1973  3,737,764

EDDY-CURRENT TEST APPARATUS FOR DETECTION OF FLAWS IN A METAL SEAL PLACED WITHIN AN ELECTRICALLY CONDUCTIVE TUBE

This invention relates to a method of eddy-current detection of flaws exhibited by a metal seal which is placed within an electrically conductive tube as well as to apparatus for carrying out said method as applicable in particular to the detection of defects in the sodium seal of a fuel element.

A number of different methods and devices for eddy-current detection of electrically conductive tubes are already known and are described in particular in French Pat. No. 1,470,386 in the name of the present Applicant and in the three certificates of addition thereto.

The basic method which forms the subject of the above-cited patent and is a method of non-destructive testing is essentially distinguished by the fact that, on the one hand, the tube under inspection which is subjected to the variable magnetic field of a primary coil which generates eddy currents therein is placed inside another coil which constitutes both the inductance of the oscillating circuit of a so-called Hartley oscillator and the coil for detecting said eddy currents or secondary coil and that, on the other hand, the potential Vg is measured between the grid of the triode of said oscillator and ground, said potential being a function of the inductive reactance $\omega L$ of said secondary coil and of its ohmic resistance R, said inductive reactance and said resistance being in turn a function of the real permeability of the tube under examination. In the case of any given value of the oscillation frequency of the primary coil, said permeability is in turn a function of the physical characteristics of said tube by means of the limiting frequency in respect to said tube so that modifications affecting the physical constants of said tube (arising in particular from flaws) are detected by variations in the potential Vg between the grid of the triode and ground.

According to the method described in the above-cited patent, the flaws in the tube under inspection are detected solely by means of variations in potential of the Hartley oscillator but this is not sufficient to detect all possible defects and especially to determine the nature of these latter.

This invention which is primarily concerned with the detection of flaws in a metal seal located within the interior of an electrically conductive tube employs not only the variations in potential or amplitude of eddy currents but also the frequency variations of these currents. It is accordingly possible to determine different types of defects or flaws in the metal seal and in particular the presence of bubbles in said seal, the thickness of said flaws in comparison with calibrated flaws and the position of these latter within the metal tube.

More specifically, the invention is concerned with a method of eddy-current detection of flaws such as bubbles in particular and of different characteristics of a metal seal which is placed within an electrically conductive tube. Said method essentially consists in recording on the one hand separately the variations in potential which are directly related to variations in amplitude of the eddy currents as a function of the abscissa of the tube and the variations in frequency of said currents also as a function of said abscissa on the other hand and simultaneously with these two variations the variations in said potential as a function of said frequency, the frequency of the eddy currents being determined as a function of the nature and shape of said tube and of said seal.

The invention is also concerned with an apparatus for carrying out said method which comprises a primary coil surrounding an electrically conductive tube containing a metal seal to be studied and sets up eddy currents therein and a coil which also surrounds said tube and constitutes both the inductance of the oscillating circuit of a so-called Hartley oscillator and the eddy-current detection coil or secondary coil. Said apparatus essentially comprises the following elements which are connected to the oscillating circuit of said Hartley assembly : a two-channel recorder for supplying separately the curve of variations in potential of the Hartley oscillator as a function of the cross-section of the tube under study and the curve of variations in frequency of the oscillations of the oscillator also as a function of said cross-section and a recorder for supplying the curve of variations in said potential and said frequency (parametric curve), a differential amplifier interposed between said oscillating circuit and the voltage channel of the two recorders, a frequency-voltage converter interposed between said oscillating circuit and the frequency channel of said two recorders, the combined analysis of the three curves thus obtained simultaneously being intended to permit interpretation of defects of the metal seal within the tube which is being studied.

Finally, the invention relates to a method for calibrating by means of model or dummy elements the three curves which are supplied by the two recorders of the apparatus.

Further properties and advantages of this invention will be brought out by the following description which gives by way of non-limitative explanation one embodiment of the apparatus in accordance with the invention and two sets of curves each comprising the three curves supplied by the apparatus in the case of a given tube element, reference being made to the accompanying drawings, in which.

In the following description, the detection of the quality of a sodium seal which is placed within a nuclear reactor fuel element will be taken as an example. This element which is also referred-to as a fuel pin is illustrated very diagrammatically in FIG. 1. Carbide pellets 15 are held in position by means of a sodium seal 16 within a stainless steel can 17.

Figure 1:
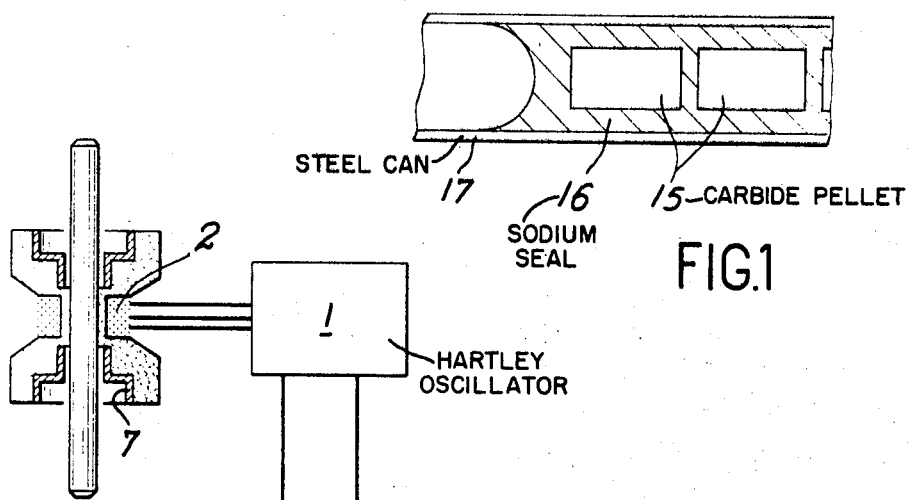
FIG. 1 shows very diagrammatically a fuel element which contains a sodium seal.

The frequency of the eddy currents must first be determined in order to detect flaws in the seal with a maximum degree of sensitivity. Referring to FIG. 1, it is apparent that the induction field which produces said currents must first pass through the steel can 17 with a low degree of attenuation but can be highly attenuated within the seal 16 so as to induce low currents at the moment when said field reaches the pellets 15. A first series of conditions for the eddy-current frequency is thus found. It is then necessary to ascertain that these values of frequency are compatible with the optimum values determined by the electrical and geometrical properties of the conductive constituents of the fuel pin.

A calculation of the depth of penetration has been made by means of the following formula:

$$\delta = 1/[(\pi f \mu \sigma)^{1/2}]$$

in which
 $\mu$ = relative permeability
 $\tau$ = conductivity
 $f$ = eddy-current frequency
 $\delta$ = thickness of conductor in respect to an attenuation of 63 percent of the initial current density.

In the case of the following thicknesses:
 can : 0.45 mm
 seal : 0.4 mm
 pellet : 3.3 mm in radius, it has thus been possible to determine as a function of the frequency the different percentages of density of currents at the internal surface of the can and of the seal as well as at the center of the pellet.

A calculation of the optimum frequencies is based on very general laws of electromagnetism (Maxwell equations). The initial step consists in calculating the characteristic frequency $fg$ of the sample to be examined by means of the formula:

$$fg = 2/(\pi \mu \sigma D^2)$$

where D designates the diameter of the sample.

A value $fg$ is thus obtained in the case of the can, the seal and the carbide pellets, the diameters of which are:

can D = 8.28 mm
 seal D = 7.3 mm
 pellets D = 6.6 mm

In order to deduce the optimum frequencies from these values of $fg$, reference may usually be made, for example, to the publication entitled "Non-destructive Testing Hand Book" by Robert C. McMaster.

It follows from these different calculations that, with a frequency of 800 kc/s, the detection sensitivity is of a low order even in the case of substantial variations in thickness of the sodium seal. On the other hand, at 20 kc/s, the detection sensitivity is substantial in the case of any variation in the seal and this will therefore be the frequency which is chosen for the eddy currents. The choice of frequency is not very critical and good results are obtained with frequencies in the vicinity of 20 kc/s.

Figure 2:
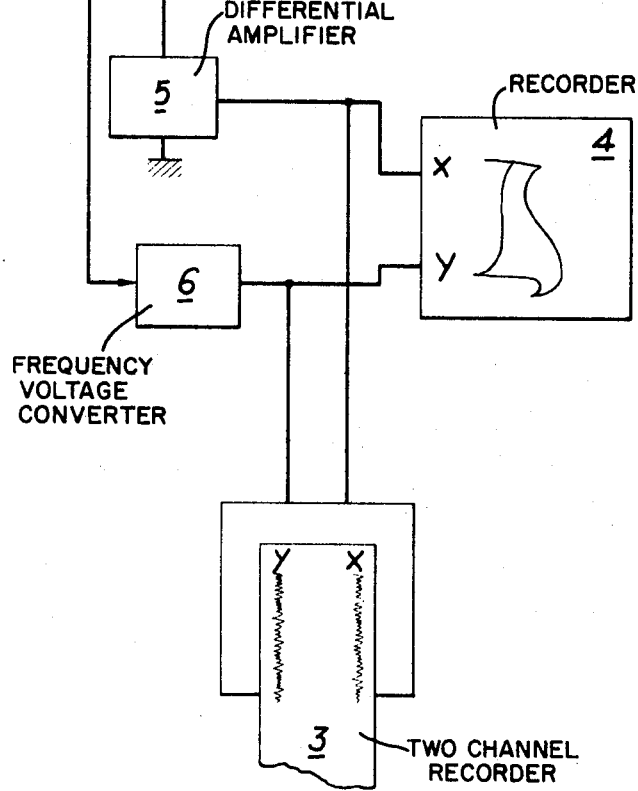
FIG. 2 shows the apparatus according to the invention in which the Hartley oscillator comprises an encircling coil having high resolution.

The apparatus in accordance with the invention as illustrated in FIG. 2 comprises a Hartley oscillator 1 in the same way as various known devices for detecting flaws by means of eddy currents. The inductance of said oscillator is a coil 2 which surrounds the sample (in this case a fuel element having a sodium seal) and said coil serves to detect the eddy currents which are set up within said sample.

This apparatus essentially comprises a Hartley oscillator 1 to which are connected a two-channel recorder (reference numeral 3) which supplies separately a curve X of variations in potential of the Hartley oscillator 1 as a function of the cross-section of the element which is being studied (that is to say as a function of time if this element passes at constant speed through the coil 2) and a curve Y of variations in frequency of the oscillations of the Hartley circuit and a recorder 4 which supplies the curve of variations of Y as a function of X (said curve results from the elimination of the independent variable of the X and Y functions). A differential amplifier 5 is interposed between the Hartley oscillator 1 and the voltage channel X of the two recorders 3 and 4 while a frequency-voltage converter 6 is interposed between the oscillator 1 and the frequency channel Y.

The differential amplifier 5 which is specially adapted to the oscillator 1 supplies voltages which are wholly proportional to the variations $\Delta V$ in the potential of the oscillator.

The frequency-voltage converter 6 is capable of providing indications which are proportional to frequency differences within the range of 0 to 2 kc/s.

The elements which form part of the Hartley oscillator and consist of connecting and tuning capacitors (not illustrated) as well as the coil 2 are designed for an oscillating frequency in the vicinity of 20 kc/s in the example which is chosen.

The position of the central tapping of the coil in the Hartley oscillator (in particular of the type described in French Pat. No. 1,470,386) plays an important part in the relative shapes of the curves X and Y.

In the case of a frequency of 20 kc/s, the best results have been found when the turns of the primary and secondary windings were in a ratio of 1/5 to 1/6.

In order to ensure good resolution, the coil 2 is advantageously provided with a shield consisting of two copper rings 7 which are intended to prevent the radiation of the electromagnetic field of the coil 2.

Before carrying out tests on actual fuel elements or in other words elements of the type comprising a sodium seal and carbide pellets, two experiments carried out on samples or dummy elements will be described hereinafter.

These samples are specially designed to determine the effect on the response of the apparatus of certain characteristic configurations of the formation of a sodium seal in an element which contains a stack of fuel pellets. In short, the object which is contemplated is to reproduce that portion of the fuel element which comprises a fissile stack and sodium seal and a sodium plug located above the pellets within the expansion-space portion of the fuel element.

Figure 3:
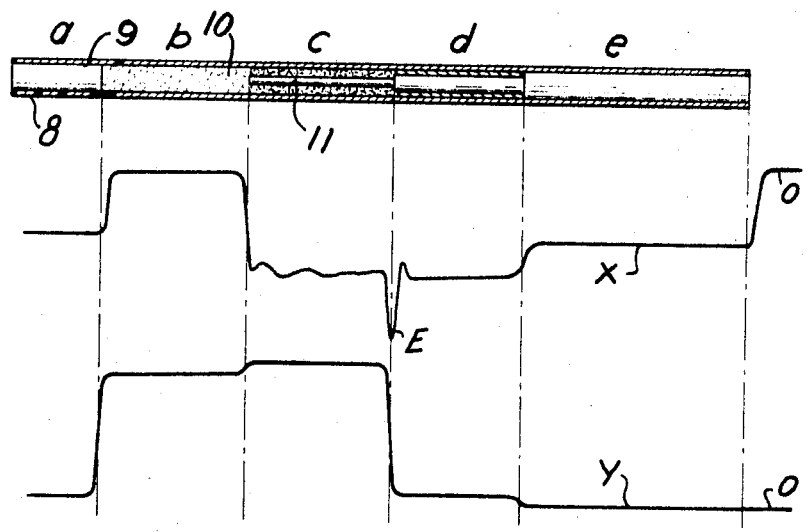
FIG. 3 shows the two curves supplied by the two-channel recorder in the case of a first sample of model element.

Inspection of two dummy samples containing copper:

First sample: there is shown in FIG. 3 the cross-section of the sample (reference numeral 8) which has five sections *a, b, c, d, e*.

This sample comprises a stainless steel can 9. The interior of said can is filled with copper at 10 and 11 in order that the presence of sodium may be simulated electrically; the copper tube (section *c*) is equivalent to a sodium seal; the stainless steel tube (section *d*) is equivalent to the carbide pellets of a real fuel sample.

a. curves obtained by means of the two-input recorder 3:
 the channel (curve Y shown in FIG. 3), namely the channel which gives the variations in frequency, is the most simple. The frequency is affected to a relatively small extent by the presence of stainless steel. In fact, the curve has the appearance of a series of stages or plateaus. There corresponds to each plateau a frequency which is plotted as ordinates and the length of one section of the sample is plotted as abscissae. The plateaus $d$ and $e$ indicate the presence of steel ; these plateaus are displaced at only a short distance from each other and the plateau O corresponds to the empty coil. On the other hand, the appearance of the copper results in a distinct displacement of frequency as is very clearly shown by the plateaus $b$ and $c$.

the channel X (curve X in FIG. 3), namely the curve which gives the variations in voltage $\Delta V$ appears at first sight to be more complex. The information obtained earlier can be completed by the two considerations which now follow.

$\alpha$. the plateaus $c$ and $b$ are relatively displaced to a substantial extent. Assuming that the section $c$ of the sample represents the column of fuel pellets of a real fuel element with a sodium seal and that the section $b$ simulates a sodium plug without meniscus, this channel must facilitate the detection of a change in thickness or in shape of the metal seal.

Figure 4:
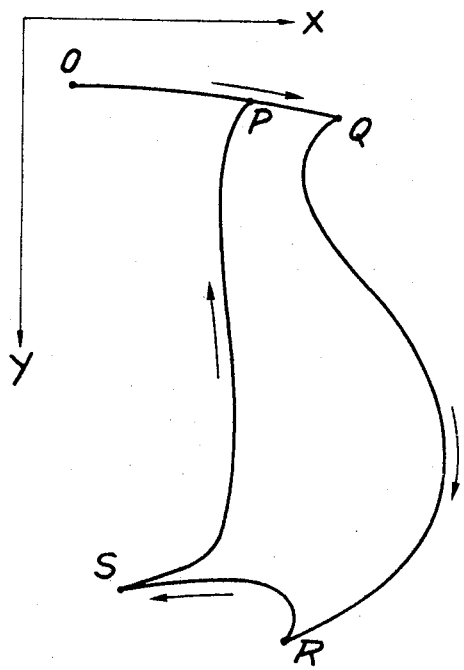
FIG. 4 shows the curve supplied by the other recorder in the case of the same first sample.

$\beta$. the presence of a very sharp peak which clearly delimits the discontinuity of composition of the sections $d$ and $c$ of the sample is noted between the plateaus $d$ and $c$. Since these two plateaus are located practically on the same ordinate, the peak represents only the structural discontinuity which is created by the appearance of the extremity of the copper tube. This extremity is therefore detected as a localized flaw.

b. a curve obtained by means of the recorder 4 (as shown in FIG. 4) :

The plateaus which were defined earlier become points or small spots in the plane which has the coordinates X (variations in voltage as abscissae) and Y (variations in frequency as ordinates). There is again to be found on this curve the sum of information obtained by studying the two curves of the two-input recorder or, in other words :

$\alpha$. the presence of copper within the can 9 causes a substantial displacement of the needle of the recorder from the point Q to the point R and then to the point S.

$\beta$. the lines which connect the points O, P, Q, R, S are distinctly curves. This essentially represents the non-linear character of the voltage variations of the oscillator (channel X). The difference in shape between the line which connects Q and R and the line which connects S and P is worthy of note since the degree of curvature of the former is much greater.

Figure 5:
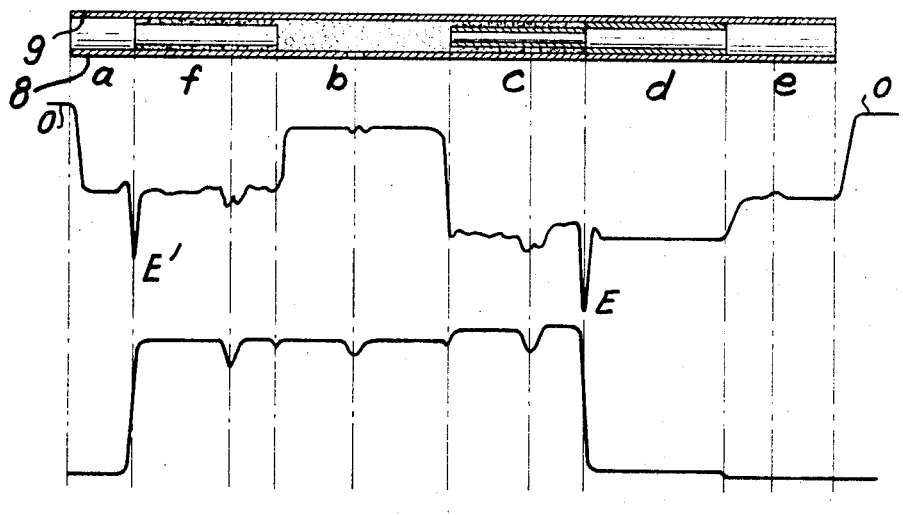
FIG. 5 shows the two curves supplied by the two-channel recorder in the case of a second fuel-element sample.
Figure 6:
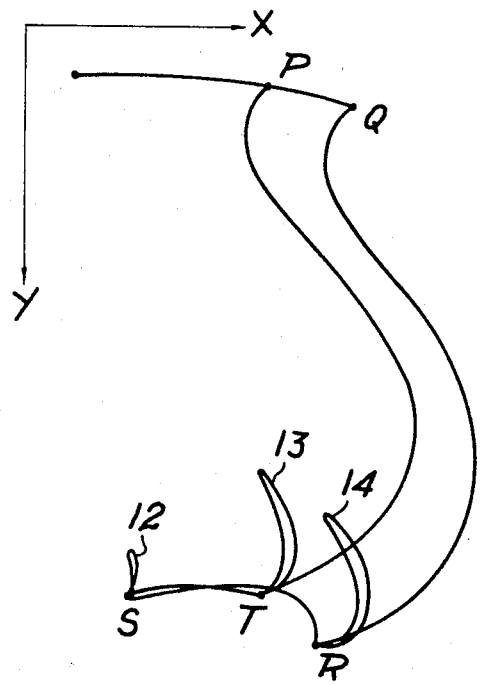
FIG. 6 shows the curve supplied by the other recorder in the case of said second sample.

Second dummy sample :

As shown in FIG. 5, said second sample comprises one more section than the first (section $f$) and consists of a copper tube (it is apparent that holes have been pierced in the copper in each section $c, b, f$.

a. Curves obtained by means of the two-input recorder 3 (as shown in FIG. 5) :

Compared with FIG. 3, there appears on channel X a peak E' which is similar to the peak E and this is normal by reason of the composition of the sample. The holes produce different signals in channel X and in channel Y. There is a certain analogy between the signals corresponding to the holes in channel X and the peaks E and E' ; this analogy is also related to the non-linear character of the variations in the voltage parameter of the oscillator.

b. Curve obtained by means of the recorder 4 (as shown in FIG. 6) :

Two separate and distinct points R and T correspond to the sections $c$ and $f$. The connection between T and P is very similar to the connection between R and Q. The three loops 14, 12 and 13 derived from the points R, S and T correspond to the holes in the copper and have a high degree of curvature.

Application to the case of a fuel element having a sodium seal :

From a study of the two sample pins which has just been made, it is possible to foresee the effect of certain characteristics which are specific to the constitution of a sodium seal in a real fuel element containing fuel pellets.

If consideration is given to the possibility of formation of a sodium plug within the can 9, a concave meniscus is necessarily formed since the sodium has a tendency to flow upwards along the walls.

It has been desired to show very diagrammatically the equivalent of a meniscus in the sample of FIG. 5 by means of the sections $b$ and $f$, in which the copper tube corresponds to the upward flow of sodium against the walls (in the meniscus). This somewhat special meniscus can be seen from FIG. 6 by following the line which connects the points S, T and P. In the study of a fuel element, the existence of a concave meniscus will be announced as a rule each time an S-shaped curve which is similar to the line STP of FIG. 6 is observed.

In the event that there is no meniscus, it is necessary to have a curve which is similar to the connection SP of FIG. 4.

In regard to the presence of a bubble in the sodium, said bubble must produce a signal resembling the loops 14, 12, 13 which are derived from the points R, S, T of FIG. 6 (the bubbles within the real fuel element correspond to the holes in the dummy element).

In order to facilitate the interpretation of signals delivered by the apparatus in accordance with the invention during the inspection of a real fuel element (namely an element having a sodium seal and carbide pellets) and in order to be able to calibrate the curves supplied by the two recorders, a model element is accordingly filled with sodium by complying with the real conditions of manufacture but by replacing the carbide pellets with stainless steel rods, the conductivity of which is close to that of carbide.

By studying the three curves which are supplied by the two recorders and have the general shape of the sets of curves of FIGS. 3 and 4 and of FIGS. 5 and 6 but which are much more complicated in detail, a detail of given shape which is provided on the curves can accordingly be related to each characteristic or flaw of the fuel element.

It is then possible to open the can which surrounds the metal seal of the model in order to confirm the nature and size of flaws which have been detected.

Calibration of the curves is thus achieved ; in other words, when a fuel element which exhibits flaws in the sodium seal (bubbles in particular) is to be inspected but said flaws cannot be observed directly or detected except by means of the apparatus in accordance with the invention, it will be necessary in order to determine such flaws only to read the three curves obtained and to interpret these latter by means of the calibration code (for example, a loop indicates the presence of a bubble).

It is readily apparent that this invention has been described in the foregoing solely by way of indication and not in any limiting sense and that any detail modifications can be contemplated without thereby departing from its scope. Broadly speaking, formula (1) shows that the method according to the invention is applicable to the detection of flaws in a metal seal which is located within a tube of different metal in the following cases :

1. The conductivity of the tube is different from the conductivity of the seal.
2. The relative permeability of the tube is different from that of the seal.

What we claim is:

1. An apparatus for eddy current detection of flaws in a metal seal within an electrically conductive tube comprising a Hartley oscillator, the tank coil of said oscillator surrounding an electrically conductive displaceable tube containing the metal seal, said coil acting as both a generator for setting up eddy currents in said tube and also as an eddy-current detection coil, means for relatively displacing the tube with respect to said tank coil, a two-channel recorder having a voltage channel and a frequency channel connected to the oscillating circuit of said Hartley oscillator, said voltage channel recording the curve of variations in potential of the Hartley oscillator, which varies with the tube cross section, as a function of the displacement of the tube and said frequency channel recording the curve of variations in frequency of the oscillations, which also varies with the cross section of the tube, as a function of the displacement of the tube, a second recorder connected to the oscillator circuit and having a voltage input and a frequency input for generating a curve of variations in said potential as a function of said variations in frequency while said tube is being displaced, a differential amplifier connected between said oscillating circuit and the voltage channel of said two channel recorder and the voltage input of said second recorder and a frequency-voltage converter connected between said oscillating circuit and the frequency channel of said two channel recorder and the frequency input of said second recorder, the three curves thus obtained simultaneously indicating defects of the metal seal within the tube.

* * * * *